(12) United States Patent
Matsubara et al.

(10) Patent No.: US 6,475,256 B2
(45) Date of Patent: Nov. 5, 2002

(54) CYCLONE TYPE GAS-LIQUID SEPARATOR

(75) Inventors: Kazuki Matsubara, Kariya (JP); Yoshitaka Nishio, Nagoya (JP); Teruaki Kitano, Wako (JP); Takaaki Kato, Wako (JP)

(73) Assignees: Denso Corporation (JP); Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/747,021

(22) Filed: Dec. 26, 2000

(65) Prior Publication Data

US 2001/0005986 A1 Jul. 5, 2001

(30) Foreign Application Priority Data

Dec. 28, 1999 (JP) ............................. 11-374476
Aug. 3, 2000 (JP) ......................... 2000-235573

(51) Int. Cl.[7] ..................... B01D 45/12; B01D 50/00
(52) U.S. Cl. ..................... 55/337; 55/426; 55/459.1
(58) Field of Search ................ 55/318, 337, 385.3, 55/426, 459.1, DIG. 19

(56) References Cited

U.S. PATENT DOCUMENTS 4,147,630 A * 4/1979 Laval, Jr. .................. 210/137
4,559,068 A * 12/1985 Lagerstedt et al. ........... 55/399
5,478,484 A * 12/1995 Michaluk ..................... 209/719

FOREIGN PATENT DOCUMENTS

| JP | 62-99351 | 6/1987 |
| JP | 5-52281 | 7/1993 |
| JP | 7-25954 | 5/1995 |
| JP | 7-112145 | 5/1995 |
| JP | 11-264312 | 9/1999 |

* cited by examiner

Primary Examiner—Robert A. Hopkins
(74) Attorney, Agent, or Firm—Nixon & Vanderhye PC

(57) ABSTRACT

A cyclone type, gas-liquid separator has a gas lead-through pipe penetrating an upper end wall of a cyclone chamber and extending downward to have a gas outlet in the cyclone chamber. A generally annular baffle plate is provided on an outer circumference of the gas lead-through pipe in the vicinity of the gas outlet to generally divide. the inside of the cyclone chamber into upper and lower. spaces. Accordingly, swirl flow formed in the upper space is prevented from being drawn directly by a negative pressure of the gas lead-through pipe without swirling sufficiently, so that separation efficiency is improved.

14 Claims, 8 Drawing Sheets

CYCLONE TYPE GAS-LIQUID SEPARATOR

CROSS REFERENCE TO RELATED APPLICATIONS

This application is based upon and claims the benefit of Japanese Patent Applications No. 11-374476 filed on Dec. 28, 1999, and No. 2000-235573 filed on Aug. 3, 2000, the contents of which are incorporated herein by reference.

BACKGROUND OF THE INVENTION

1. Field of the Invention

This invention, relates generally to a cyclone type gas-liquid separator for separating a liquid component contained in gas by a centrifugal force, which is, for example, used as an oil mist separator for separating oil mist contained in blow-by gas in a positive crankcase ventilation system.

2. Description of the Related Art

In a positive crankcase ventilation system, blow-by gas leaked into a crankcase through a gap between a piston and a cylinder wall is returned to an intake system, and accordingly is prevented from being emitted into atmosphere. The crankcase is connected to an intake pipe via a circulation flow passage equipped with a PCV valve, and forcibly discharges blow-by gas therein by utilizing a negative pressure in the intake pipe. Accordingly, unburned HC (hydrocarbon) contained in the blow-by gas is burned in an engine and the inside of the crankcase is ventilated, thereby preventing deterioration of engine oil.

Generally, blow-by gas contains a misty oil component (oil mist). To prevent oil mist from flowing into the intake pipe, conventionally, an oil mist separator is disposed in the circulating flow passage extending to the intake pipe. The oil mist separator conducts blow-by gas into a cylindrical cyclone chamber and makes it swirl flow, and the oil component contained in the blow-by gas is separated due to a centrifugation action thereof. The separated oil component is discharged through an oil discharge pipe to an oil pan or the like. The gas from which the oil component is separated is returned into the intake pipe through a gas outlet provided at an upper end portion of the cyclone chamber.

In this kind of cyclone type oil mist separator, it is required to improve an oil separation efficiency to decrease an amount of oil flowing into the intake pipe. In this connection, for example, JP-A-11-264312, discloses a structure in which swirl flow in a gas lead-through pipe extending upward from a gas outlet is enhanced by making a minimum cross-sectional area of the gas lead-through pipe smaller than a cross-sectional area of a gas inlet communicating with a cyclone chamber, and an oil component that is to flow into the gas lead-through pipe is scattered in an oil spreader chamber at an upper side there of.

In this structure, because the centrifugation effect of the swirl flow is enhanced, separation and collection efficiencies of the oil component can be improved. However, because the cross-sectional area of the gas lead-through pipe is decreased, there arises a problem that a pressure loss in the device is increased.

SUMMARY OF THE INVENTION

The present invention has been made in view of the above problem, and an object of the present invention is to improve a separation, efficiency of gas and liquid without increasing a pressure loss in a cyclone type gas-liquid separator.

According to the present invention, a gas-liquid separator has a generally cylindrical vessel defining therein a cyclone chamber and having a gas inlet being open on an inner circumferential wall of the cyclone chamber for introducing a gas into the cyclone chamber. A gas lead-through pipe has a gas outlet and communicates with the cyclone chamber through the gas outlet. The gas outlet is disposed separately from the gas inlet in an axial direction of the vessel.

Further, a baffle plate is disposed in the cyclone chamber and generally dividing a space between the gas outlet and the gas inlet to form a gas flow flowing from the gas inlet toward the gas outlet along the inner circumferential wall. The gas lead-through pipe protrudes from the baffle plate at an opposite side of the gas inlet.

In the constitution described above, because the inside of the s chamber is divided by the baffle plate into a gas inlet side space and a gas outlet side space, gas introduced from the gas inlet is prevented from being drawn directly by a negative pressure of the gas lead-through pipe without swirling sufficiently, and the gas can form a swirl flow flowing along the inner circumferential wall. As a result, a separation efficiency of a liquid component from gas is improved. Because there is no need to decrease a cross-sectional area of the gas lead-through pipe and the swirl flow progresses smoothly along the inner circumferential wall, no disturbance of the flow occurs and pressure loss is lowered.

Because the lead through pipe protrudes from the baffle plate at the opposite side of the gas inlet, the liquid component separated from the gas is difficult to be discharged through the gas outlet. Further, the effect for making the gas flow along the inner circumferential wall is enhanced.

Preferably, the gas lead-through pipe penetrates a generally central portion of an en d wall of the cyclone chamber to extend in the cyclone chamber. Accordingly, the effect of the gas lead-through pipe to the swirl flow becomes small.

Preferably, the baffle plate is disposed along the inner circumferential wall at a position closer to the gas outlet than to the gas inlet. Accordingly, disturbing the swirl flow at the side close to the inner circumferential wall becomes more difficult, resulting in improvement of the gas-liquid separation efficiency.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS

Figure 2:
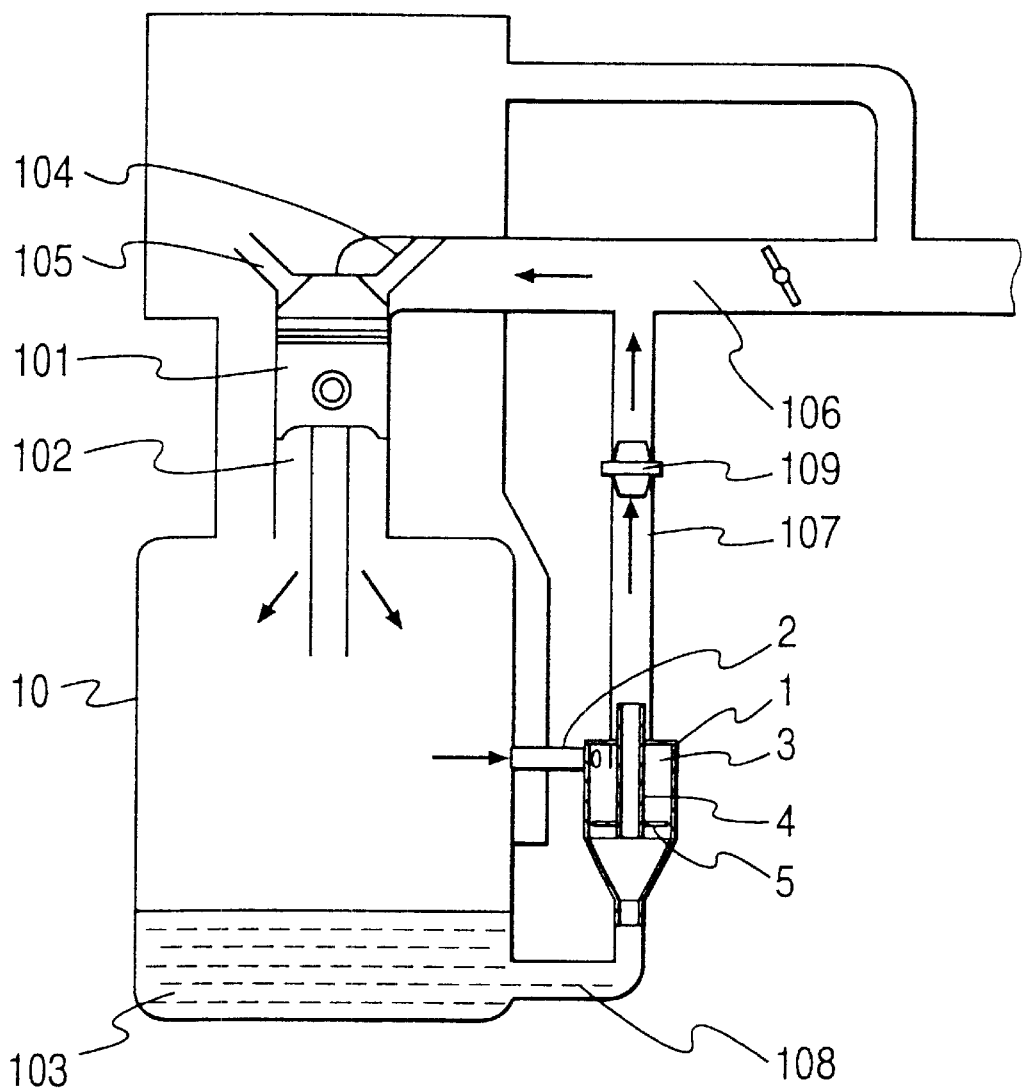
FIG. 2 is a diagram showing an entire constitution of a positive crankcase ventilation system equipped with the oil mist separator in the first embodiment.

A first preferred embodiment of the invention will be explained with reference to appended drawings. Referring to FIG. 2 showing an entire constitution of a positive crankcase ventilation system including an oil mist separator 1, a crankcase 10 of an engine is provided at a lower side of a cylinder 102 in which a piston 101 is accommodated to perform reciprocation motion. Blow-by gas, which is leaked from a gap between, the piston 101 and the wall of the cylinder 102, exists inside the crankcase 10. An oil pan 103 is provided at the lower side of the crankcase 10, and stores lubricating oil for lubricating between the piston 101 and the cylinder 102. An intake valve 104 and an exhaust valve 105 are provided at the upper portion of the cylinder 102, and respectively communicate with an intake pipe 106 and an exhaust pipe (not shown) of the engine.

The oil mist separator to which the present invention is applied is provided at one side of the crankcase 10. Blow-by gas is introduced into the separator 1 through a gas introduction pipe 2 connected to the side wall of the crankcase 10, and is introduced into a circulation flow passage 107 extending to the intake pipe 106, after separating an oil component therefrom. The bottom portion of the crankcase 10 communicates with the oil pan 103 via an oil collection passage 108. In the circulation flow passage 107, a well-known PCV valve (positive crankcase ventilation valve) 109 is provided to control a flow amount of blow-by gas.

Figure 1A:
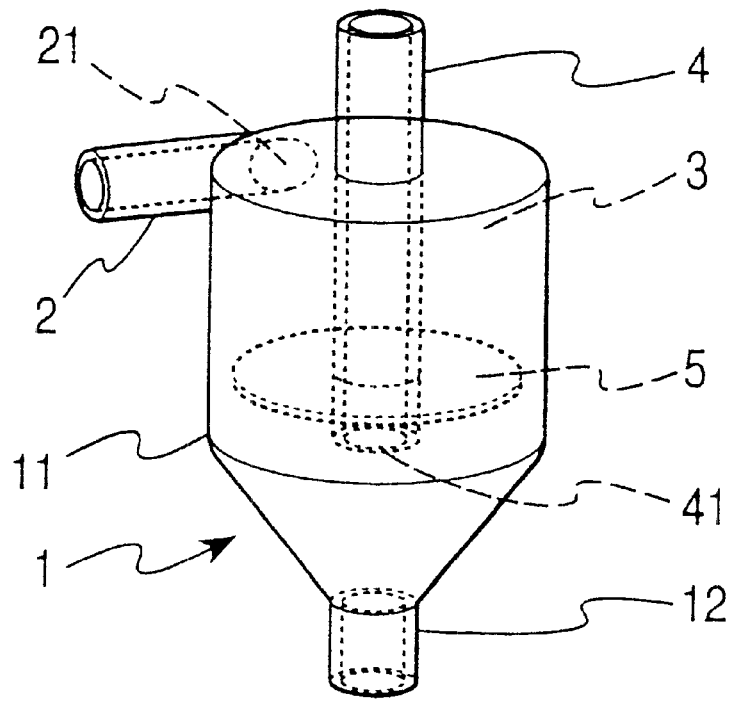
FIG. 1A is a perspective view showing an oil mist separator in a first preferred embodiment.
Figure 1B:
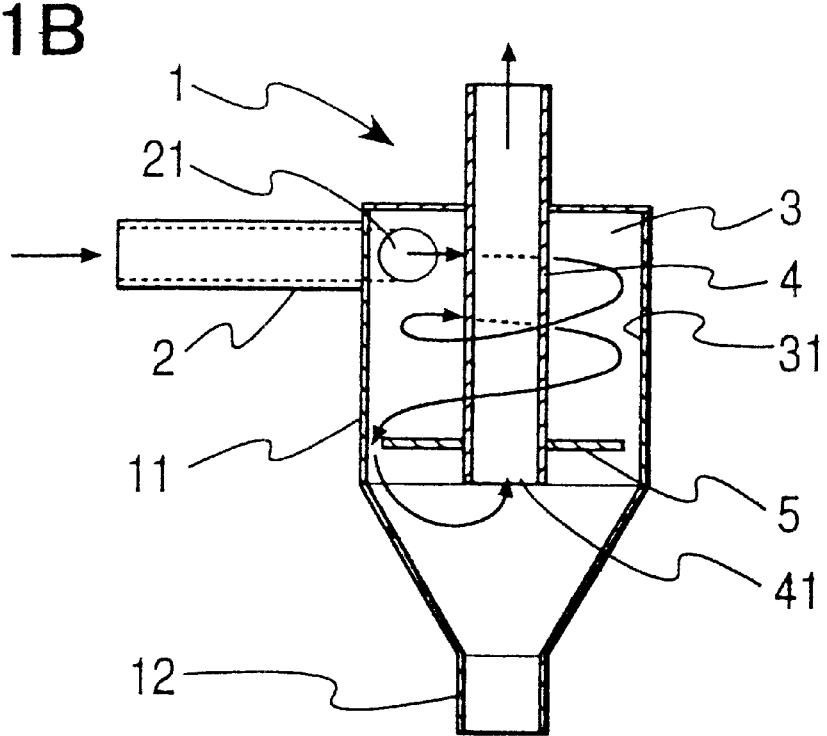
FIG. 1B is a cross-sectional view showing the oil mist separator in the first embodiment.

Referring to FIGS. 1A and 1B, the oil mist separator 1 has a generally cylindrical vessel 11 having a tapered lower portion and defining therein a cyclone chamber 3. A gas inlet 21 for introducing blow-by gas is provided on a circumferential wall close to the upper end portion of the cyclone chamber 3, and the gas introduction pipe 2 is connected to the gas inlet 21 to communicate with the crankcase 10. The gas introduction pipe 2 is disposed in a normal direction of the circumferential wall so that blow-by gas introduced from the gas inlet 21 flows in a circumferential direction along the inner wall surface 31 of the cyclone chamber 3. Accordingly, blow-by gas forms swirl flow along the inner wall surface 31 of the cyclone chamber 3, and an oil component is separated by the centrifugation action of the swirl flow when it progresses downward while swirling in the circumferential direction.

A gas lead-through pipe 4 penetrates the upper surface center portion of the; cyclone chamber 3 and extends inside thereof. The gas lead-through pipe 4 is disposed concentrically in the upper half portion of the cyclone chamber 3, and has a lower end opening serving as a gas outlet 41. The circulation flow passage 107 shown in FIG. 2 is connected to the upper end portion of the gas lead-through pipe 4, and blow-by gas from which the oil component is separated is led out into the intake pipe 106 through the circulation flow passage 107.

The lower half portion of the cyclone chamber 3 is tapered downward and has a funnel-shape with a lower end opening portion that serves as the oil discharge pipe 12 to which the oil collection passage 108 is connected as shown in FIG. 2. The separated oil component is guided by the inner wall surface 31 of the cyclone chamber 3 to move to the lower side of the chamber 3, and to flow into the oil collection passage 108 through the oil discharge pipe 12.

Next, features of the present invention will be described in detail. In the present embodiment, a first baffle plate 5 composed of a ring-shaped plate member is provided at the lower end peripheral portion of the gas lead-through pipe 4 and encircles the pipe 4. The baffle plate 5 is fixed at a somewhat upper portion of the lower edge of the gas lead-through pipe 4 to be approximately parallel to the upper end surface of the cyclone chamber 3, and the gas outlet 41 is open at the lower portion thereof in a protruding state.

The first baffle plate 5 generally divides the inside of the cyclone chamber 3 into an upper space where the gas. inlet 21 opens, and a lower space where the gas outlet 41 opens, with a baffle function that makes blow-by gas swirl along the inner wall, surface 31 of the cyclone chamber 3 while preventing the blow-by gas from being led out without swirling sufficiently due to a negative pressure in the gas. lead-through pipe 4. Accordingly, swirl flow can be easily formed in the cyclone chamber 3, so that the separation efficiency of the oil component is enhanced and the pressure loss is suppressed.

The upper space and the lower space of the cyclone chamber 3 communicate with each other through an annular gap provided between the outer circumference of the baffle plate 5 and the inner wall surface 31 of the cyclone chamber 3. The annular gap allows gas flow in the upper space to progress along the inner wall surface 31, and is appropriately defined not to prevent the communication between the upper space and the lower space.

The operation of the oil mist separator 1 having the structure described above will be explained below. In FIGS. 1A, 1B, and 2, blow-by gas in the crankcase 10 flows, through the gas introduction pipe 2 and the gas inlet 21, into the cyclone chamber 3 in a tangent direction of the cyclone chamber 3, and forms swirl flow that flows along the inner wall surface 31 thereof.

Oil mist contained in the blow-by gas is separated by a centrifugal force of the swirl flow during the time when the swirl flow progresses downward while swirling in the cyclone chamber 3. The separated oil mist is liquefied on the inner wall surface 31, moves downward along the inner wall surface 31 due, to the self-weight thereof, and is collected in the oil pan 103 through the discharge pipe 12 and the collection passage 108.

The collected liquefied oil mist is reused as lubricating oil. On the other hand, the blow-by gas from which the oil mist is separated flows into the lower space through the gap between the first baffle plate 5 and the inner wall surface 31, and is led out into the intake pipe 106 through the gas outlet 41, the gas lead-through pipe 4, and the circulation flow passage 107.

Here, it is known that increasing contact chance (distance, time) between blow-by gas and the inner wall surface 31 is effective to improve the separation efficiency of the oil component. That is, the larger the swirling number of times of the swirl flow flowing along the inner wall surface 31 is, the easier the separation of the oil mist becomes. In a conventional constitution dispensing with the first baffle plate 5, however, it is found that although swirl flow is formed along the inner wall surface 31 immediately after blow-by gas is introduced into the cyclone chamber 3, the gas flow progresses toward the gas outlet 41 due to a negative pressure in the gas lead-through pipe 4, and the swirling force of the swirl flow is reduced.

In this connection, according to the present invention, the first baffle plate 5 is disposed at the side closer to the gas outlet 41 than to the gas inlet 2, and in the vicinity of the outer circumference of the gas outlet 41. Accordingly, blow-by gas is prevented from being led out due to the negative pressure in the gas lead-through pipe 4 without swirling sufficiently. Because of this, the blow-by gas introduced from the gas inlet 21 can swirl sufficiently along the inner wall surface 31 until the blow-by gas enters the lower space of the cyclone chamber 3. As a result, the swirling number of the times is increased so that the contact chance with the inner wall surface 31 is significantly increased. That is, the separation efficiency is largely improved by utilizing the entire area of the inner wall surface 31 efficiently.

Because there is no need to reduce the cross-sectional area of the gas lead-through pipe 4 to enhance the swirling force, the separation efficiency of oil can be improved without increasing the pressure loss. Further, the rise in pressure loss in the conventional constitution is caused by the disturbance of gas flow in the vicinity of the small-diameter gas outlet. On the other hand, in the above constitution of the invention, because the introduced blow-by gas flows smoothly along the inner wall surface 31, disturbance of flow hardly occurs, and accordingly, the pressure loss can be suppressed at a low level.

Figure 3:
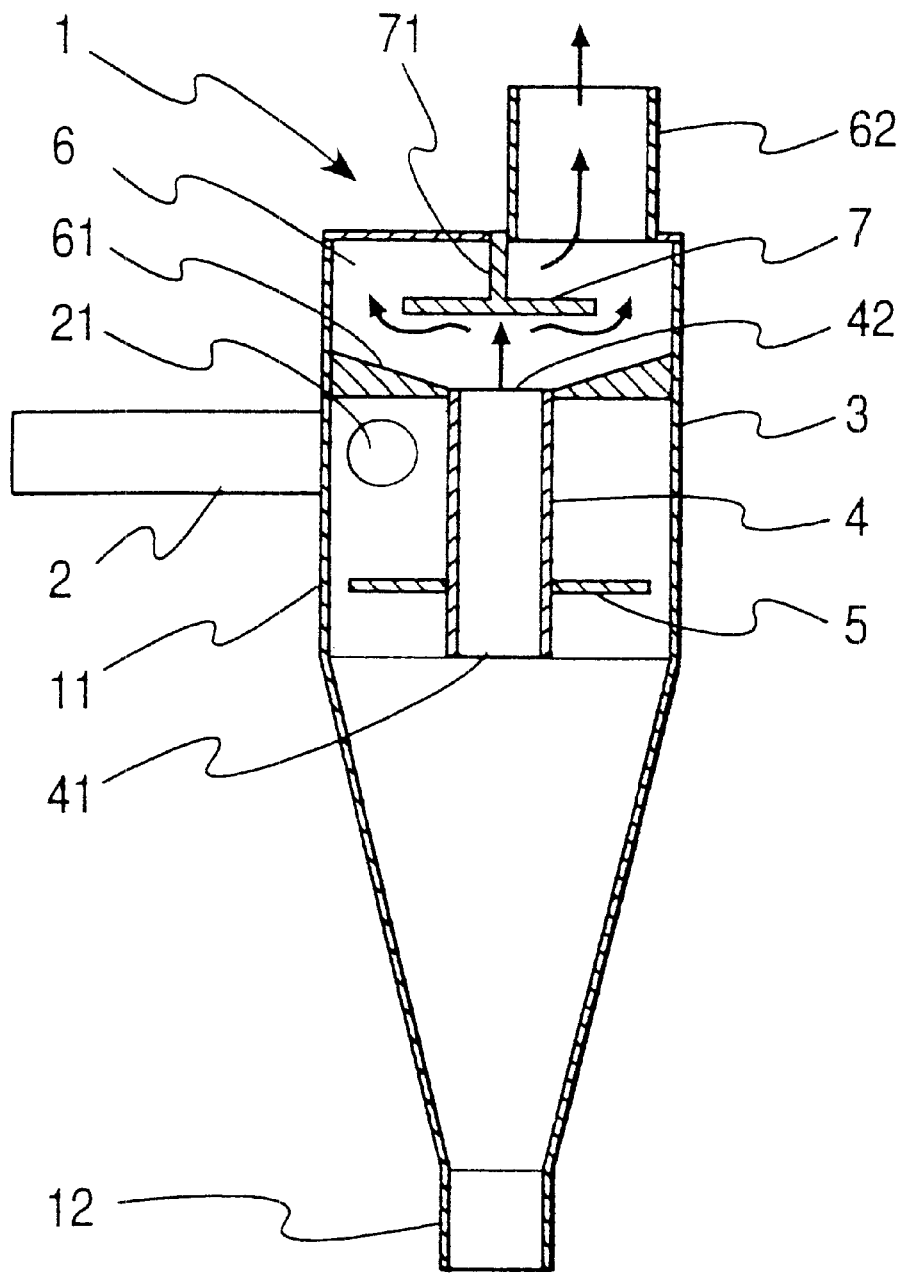
FIG. 3 is a vertical cross-sectional view showing an oil mist separator in a second preferred embodiment.

FIG. 3 shows a second preferred embodiment of the invention, in which the same parts as those in the first embodiment are indicated by the same reference numerals. In the second embodiment, an oil spreader chamber 6 is provided, which is partitioned y a partition wall at an upper side of the cyclone chamber 3. An upper end (opening) 42 of the gas lead-through pipe 4 is open on the bottom surface 61 of the oil spreader chamber 6, and a disk-like second baffle plate. 7 is provided at the central portion of the oil spreader chamber 6 to face the gas lead-through pipe 4.

The second baffle plate 7 is fixed to the top surface of the oil spreader chamber 6 via a support shaft 71 extending upward from the central portion thereof. Oil component contained in blow-by gas discharged from the opening 42 hits the second baffle plate 7 to be separated. The bottom surface 61 of the oil spreader chamber 6 has a conical shape that isftapered toward the opening 42.

The blow-by gas hit the second baffle plate 7 changes the flowing direction thereof, flows along the second baffle plate 7 in the radial direction thereof, and rises along the inner wall surface of the oil spreader chamber 6 to be led into the circulation flow passage 107 through a communication pipe 62. The other features are substantially the same as those in the first embodiment.

According to the constitution described above, remaining oil component that is not separated in the cyclone chamber 3 can be separated by hitting the blow-by gas against the second baffle plate 7 and by making it contact the inner wall surface. As a result, the separation efficiency of the oil component can be further improved. Further, the separated oil component flows into the opening 42 from the conical-shape bottom surface 61, and is collected through the gas lead-through pipe 4. Thus, the addition of a simple composition can realize high effects. Incidentally, in the present embodiment, although both the first and second baffle plates 5, 7 are provided, only the second baffle plate 7 may be provided.

Figure 4A:
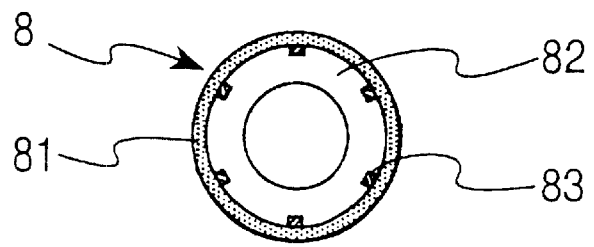
FIG. 4A is a lateral cross-sectional view showing a part of an oil mist separator, taken along line IVA—IVA in FIG. 4B, in a third preferred embodiment.
Figure 4B:
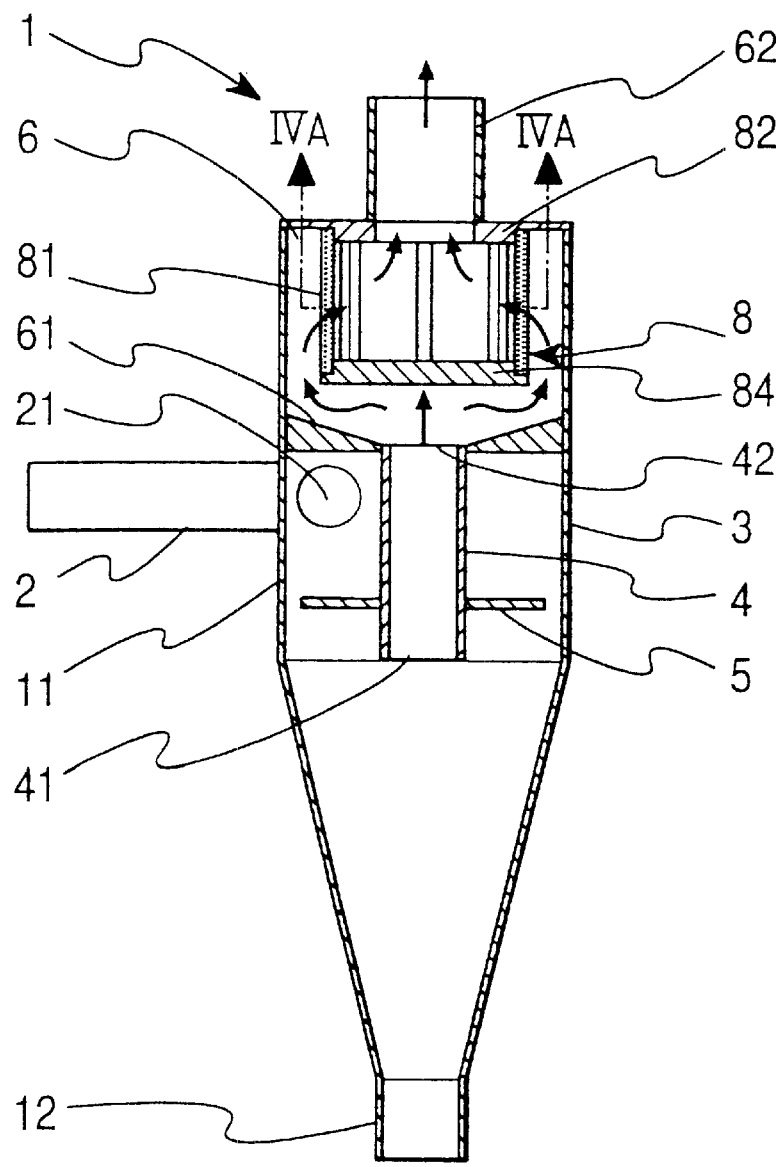
FIG. 4B is a vertical cross-sectional view showing the oil mist separator in the third embodiment.

FIGS. 4A and 4B show a third preferred embodiment of the invention. In the third embodiment, a filter member 8 serving as a second baffle plate is provided in place of the second baffle plate 7 in the second embodiment. The filter member 8 is composed of a cylindrical support member 82 and a cylindrical filter material 81 fixed to the outer circumference of the support member 82.

The support member 82 has plural ribs 83 provided on the circumferential surface thereof at an equal interval and protruding therefrom, and supports the inner circumferential surface of the cylindrical filter material 81 by the ribs 83. The support member 82 further has a disk-like bottom surface 84 that serves as the second baffle plate, and an upper end surface having an opening at the center thereof. The opening communicates with the communication pipe 62. Incidentally, the oil spreader chamber 6 has an opening at an upper end thereof, and is closed by attaching the filter member 8 having a flange to the upper end face outer circumference thereof.

In the above constitution, blow-by gas introduced from the opening 42 hits the bottom surface 84 of the filter member 8 serving as the second baffle plate, flows along the bottom surface 84 in the radial direction, rises along the inner wall surface of the oil spreader chamber 6, and then is discharged from the communication pipe 62 after passing through the filter member 8.

In the cyclone type oil mist separator, because the separation is performed by the centrifugal force, a gas flow speed is large. This is advantageous when the flowing amount is large, however, there is a case where the swirling force is insufficient when the flowing amount is small. In the present embodiment, the filter member 8 is provided in addition to the second baffle plate to trap the oil component by the filter material 81. Therefore, even at the low flowing amount state, the oil component can be efficiently trapped and the separation efficiency of the oil component can be enhanced.

Incidentally, because the filter material 81 is located at the downstream side of the bottom surface 84 of the filter member 8 serving as the second baffle plate, gas from which oil component is almost separated passes through the filter material 81. Therefore, the load caused by clogging of the filter material 8 can be suppressed from increasing.

Figure 5A:
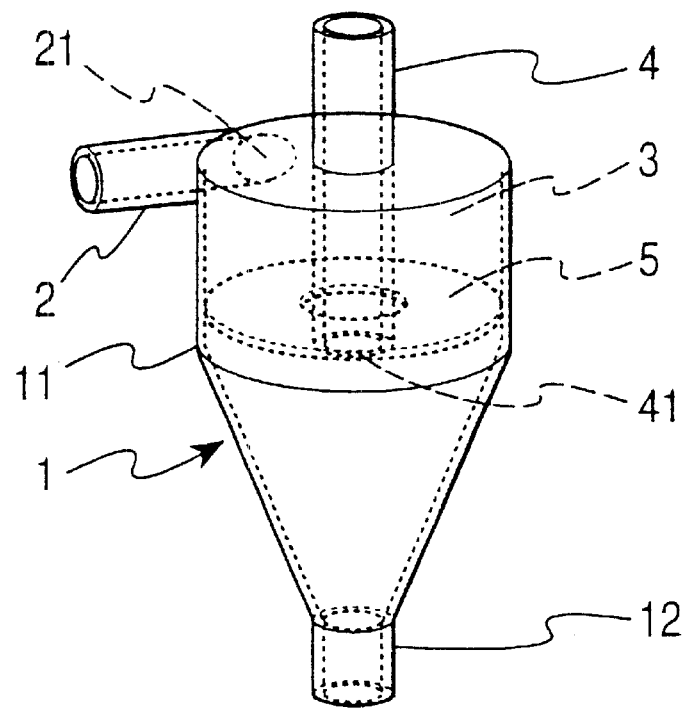
FIG. 5A is a perspective view showing an oil mist separator in a fourth preferred embodiment.
Figure 5B:
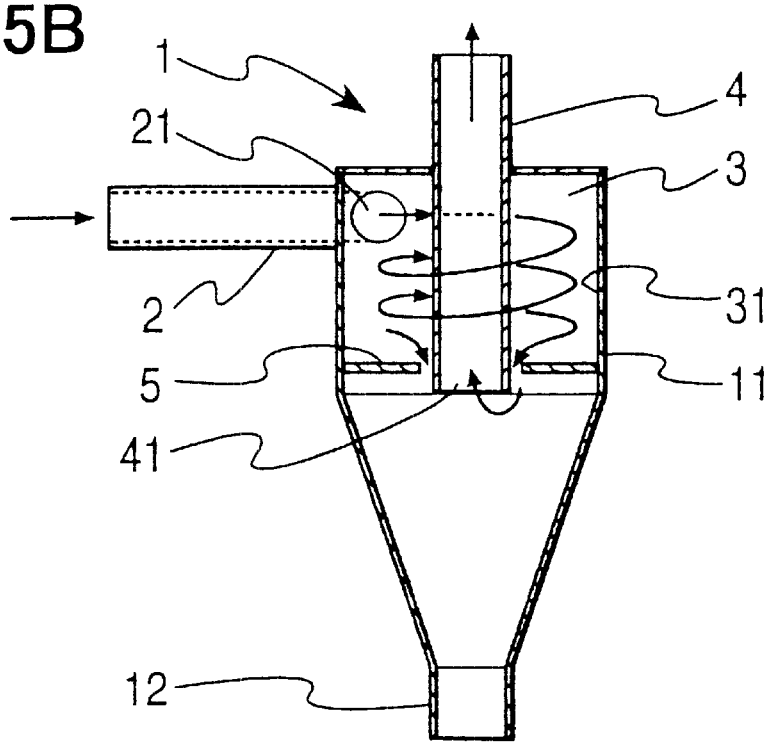
FIG. 5B is a vertical cross-sectional view showing the oil mist separator in the fourth embodiment.

FIGS. 5A and 5B show a fourth preferred embodiment of the invention. In the embodiments described above, the first baffle plate 5 is provided on the outer circumference of the gas lead-through pipe 4 and fixed thereto. However, as in the fourth embodiment, the first baffle plate 5 may be provided along the inner wall surface 31 and fixed thereto. The other features of this embodiment are substantially the same as those in the first embodiment.

The first baffle plate 5 is positioned at the somewhat upper location than the gas outlet 4 similarly to the first embodiment, and the gas lead-through pipe 4 protrudes downward from the first baffle plate 5. Blow-by gas introduced from the gas inlet 21 flows downward while swirling and reaches the gas outlet 41 after passing through an annular gap defined between the inner circumference of the first baffle plate 5 and the outer circumference of the gas lead-through pipe 4.

The position of the first baffle plate 5 is not limited to that described above so long as it is closer to the gas outlet 41 than to the gas inlet 21. Accordingly, swirl flow flowing along the inner wall surface 31 of the cyclone chamber 3 can be effectively formed, and the separation efficiency can be improved as well. Further, in the above constitution, because the first baffle plate 5 is not fixed to the outer circumference surface of the gas lead-through pipe 4, the oil component attached to the outer surface of the gas lead-through pipe 4 can drop by the self-weight thereof to be discharged smoothly, thereby improving the collection efficiency.

Figure 6:
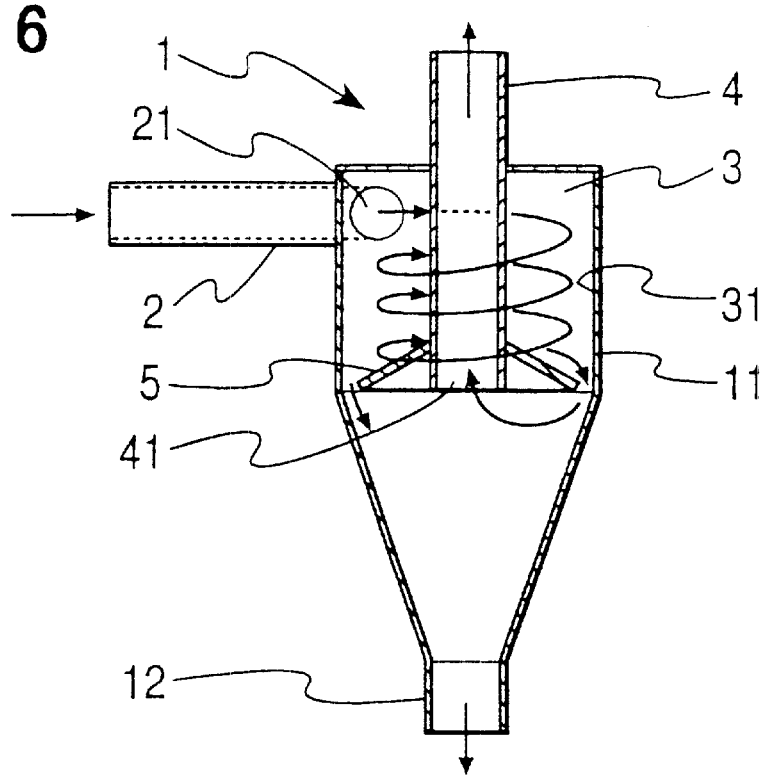
FIG. 6 is a verrtical cross-sectional view showing an oil mist separator in a fifth preferred embodiment.

FIG. 6 shows a fifth preferred embodiment of the invention. The fifth embodiment is different from the first embodiment in the shape of the first baffle plate 5. Specifically, in the fifth embodiment, the first baffle plate 5 is tapered from the outer circumference side (free end side) toward the inner circumference side (fixation end side).

The other features such as that the first baffle plate 5 is fixed to the outer circumference of the gas lead-through pipe 4 at the somewhat upper location of the gas outlet 41 and that the first baffle plate 5 is disposed approximately parallel to the upper end face of the cyclone chamber 3 as a whole are substantially the same as those in the first embodiment.

Thus, even with the constitution in which the first baffle plate 5 is fixed to the outer circumference of the gas lead-through pipe 4, the oil component attached to the outer surface of the gas lead-through pipe 4 can be dropped and discharged easily without being collected on the baffle plate 5 by inclining the baffle plate surface downward. Alternately, in the constitution in which the first baffle plate 5 is fixed to the inner wall surface 31 of the cyclone chamber 3, the first baffle plate 5 can be shaped to be inclined downward from the fixation end side toward the free end side.

Figure 7:
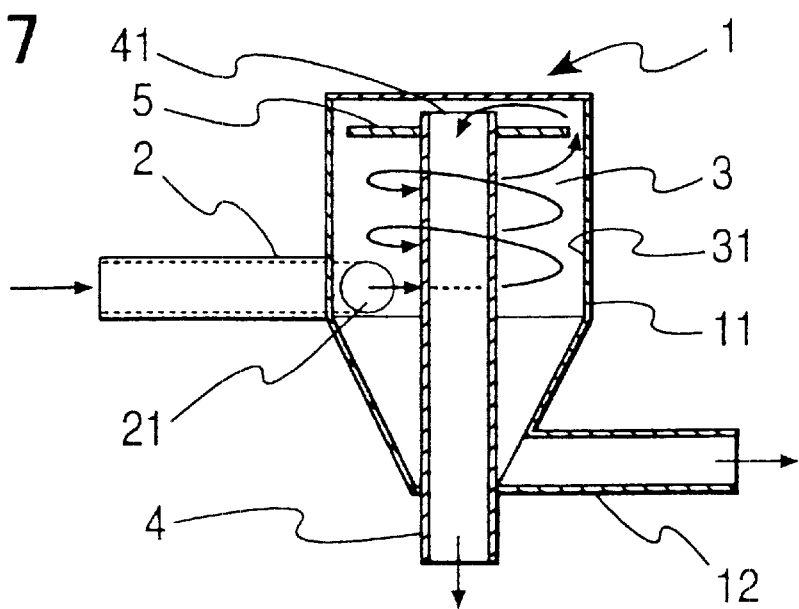
FIG. 7 is a vertical cross-sectional view showing an oil mist separator in a sixth preferred embodiment.

FIG. 7 shows a sixth preferred embodiment of the invention. In the first embodiment, blow-by gas is made to flow downward from the gas inlet 21 provided at the upper portion to the gas outlet 41 provided at the lower portion. As opposed to this, in the sixth embodiment, blow-by gas is made to flow upward.

That is, in this embodiment, the gas lead-through pipe 4 extends upward while penetrating not the upper end face but the lower end face central portion of the cyclone chamber 3, and the gas outlet 41 is open at the location in the vicinity of the upper end face of the cyclone chamber 3. The gas inlet 21 is open at the location in the vicinity of the boundary portion between the upper-half portion and the tapered lower-half Portion of the cyclone chamber 3. Accordingly, blow-by gas flows upward while swirling due to a negative pressure in the gas lead-through pipe 4.

The first baffle plate 5 is fixed to the outer circumference of the gas lead-through pipe 4 at the location closer to the gas outlet 41 than to the gas inlet 21 and somewhat lower than the gas outlet 41, and divides the space defined between the gas outlet 41 and the gas inlet 21 into upper and lower spaces so that swirl flow is smoothly formed at the upstream side of the first baffle plate 5. Blow-by gas, from which the oil component is separated, passes through the gap between the outer circumference of the first baffle plate 5 and the inner wall surface 31, reaches the gas outlet 41, and is conducted to the outside after flowing downward in the gas lead-through pipe 4. The separated oil component falls along the inner wall surface 31, and is collected via the oil discharge pipe 12 extending sideward from the lower end circumference wall of the cyclone chamber 3.

According to the constitution described above, likewise, decreased pressure loss and increased separation efficiency can be realized due to the effect of the first baffle plate 5. Here, the oil component is liable to flow downward. In this embodiment, because the swirl flow is made to flow upward from the gas inlet 21 to the gas outlet 41, the separated oil component is difficult to move toward the upper side gas outlet 41 by evaporation and scattering caused by the gas flow. This results in further improvement of the separation efficiency.

Figure 8:
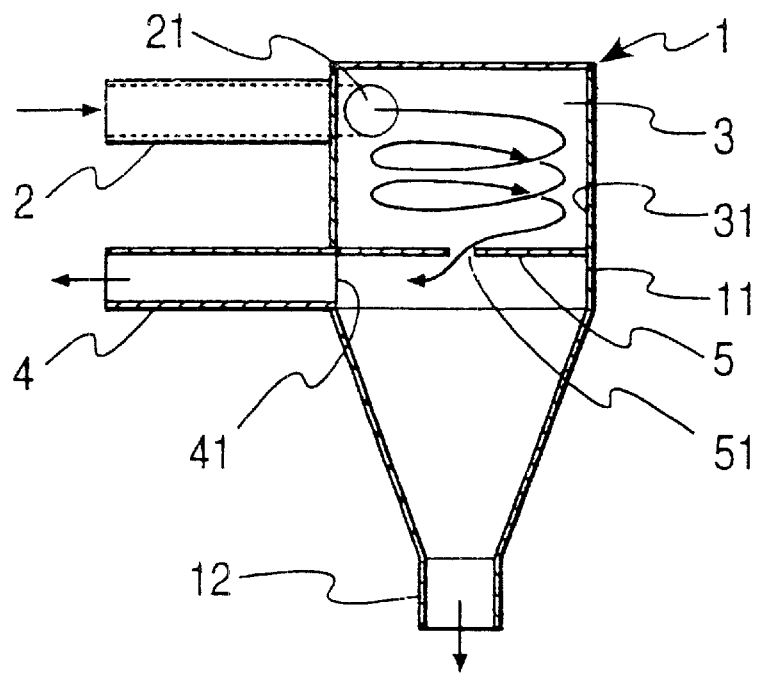
FIG. 8 is a vertical cross-sectional view showing an oil mist separator in a seventh preferred embodiment.

FIG. 8 shows a seventh preferred embodiment of the invention. In this embodiment, the gas lead-through pipe 4 extends sideward from the cyclone chamber 3 in the vicinity of the boundary portion between the upper-half portion and the tapered lower-half portion, and the gas outlet 41 is open on the inner wall surface 31 of the cyclone chamber 3. The annular first baffle plate 5 is horizontally fixed to the inner wall surface 31 adjacent to the upper edge of the gas outlet 41. The upper space at the side of the gas inlet 21 and the lower space at the side of the gas outlet 41 communicate mutually through a communication hole 51 provided at the center of the first baffle plate 5.

In the constitution described above, blow-by gas introduced from the gas inlet 21 forms swirl flow along the inner wall surface 31 by the effects of the first baffle plate 5, flows downward while separating the oil component therefrom, and is discharged from the gas outlet 41 after passing through the communication hole 51. The separated oil component falls along the inner wall surface 31, enters the lower space from the communication hole 51, and is collected through the oil discharge pipe 12 provided at the bottom portion.

Thus, the gas lead-through pipe 4 may not open inside the cyclone chamber 3, and alternately, may be open on the inner wall surface 31. The cyclone effect can be sufficiently attained by dispensing with the gas lead-through pipe 4 extending in the axial direction of the cyclone chamber 3. Further, because the first baffle plate 5 is so constructed that it is fixed to the inner wall surface 31 with the communication hole 51 at the center thereof, it is difficult to disturb the swirl flow flowing at the position close to the inner wall surface 31, resulting in improvement of the separation efficiency.

Figure 9:
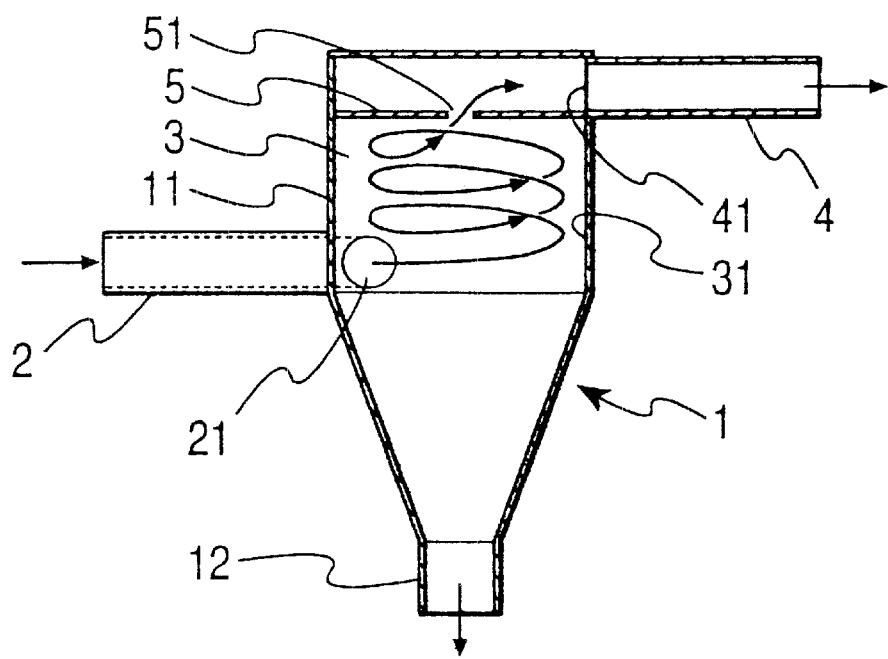
FIG. 9 is a vertical cross-sectional view showing an oil mist separator in an eighth preferred embodiment.

FIG. 9 shows an eighth preferred embodiment of the invention. This embodiment is provided in combination of the features of the sixth and seventh embodiments. Specifically, the gas inlet 21 is open at the position where the gas outlet 41 is open in the seventh embodiment, so that the swirl flow is made to flow upward as in the sixth embodiment. The gas outlet 41 is open on the inner wall surface 31 at the upper end portion of the cyclone chamber 3, and the gas lead-through pipe 4 extends sideward from this position. The first baffle plate 5 has the communication hole 51 at the center thereof as in the seventh embodiment, and is fixed to the inner wall surface 31 close to the lower edge of the gas outlet 41.

In the constitution described above, blow-by gas introduced from the gas inlet 21 forms swirl flow along the inner wall surface 31, rises upward while separating the oil component therefrom, and is discharged from the gas outlet 41 after passing through the communication hole 51. As in the seventh embodiment, this constitution can exhibit cyclone effect sufficiently, and improve the separation efficiency by preventing the disturbance of the swirl flow. Further, as in the sixth embodiment described above, because the first baffle plate 5 and the gas outlet 41 are positioned at the upper portion of the gas inlet 21, the separated oil component is prevented from being discharged from the gas outlet 41 sufficiently. This results in further improvement of the separation efficiency.

In case where the first baffle plate 5 is provided on the outer circumference of the gas lead-through pipe 4 in the present invention, the location is not limited to those in the above embodiments so long as it is closer to the gas outlet 41 than to the gas inlet 21. For example, the first baffle plate 5 may be provided adjacently to the lower end edge portion of the gas lead-through pipe 4. The first baffle plate 5 needs not be fixed to the outer circumference of the gas lead-through pipe 4.

Figure 10A:
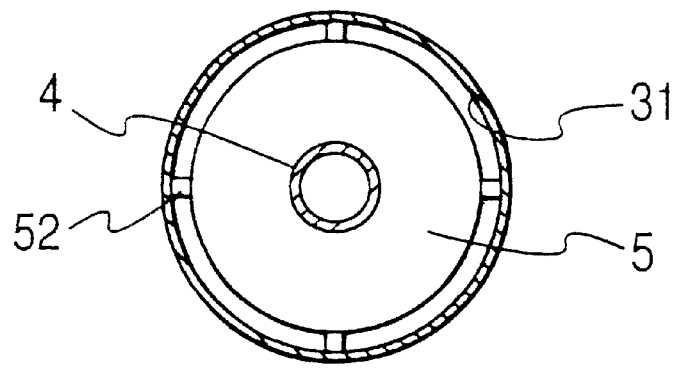
FIG. 10A is a front view showing a first baffle plate it of an oil mist separator in a ninth preferred embodiment.
Figure 10B:
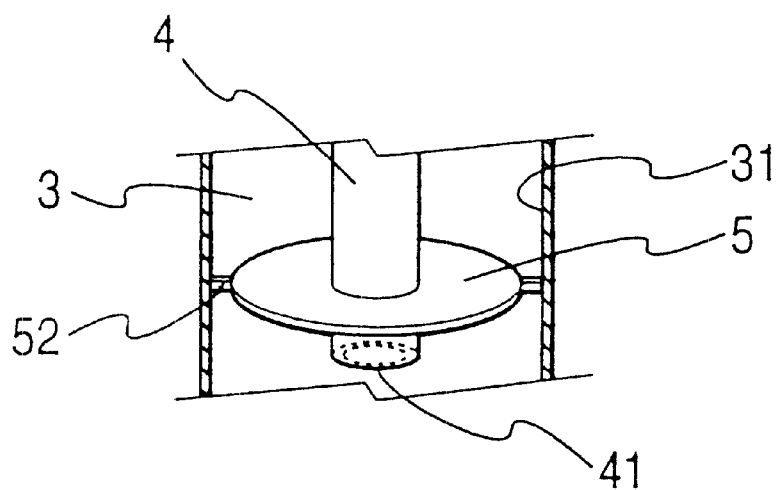
FIG. 10B is a perspective view partially showing a state where the first baffle plate is attached to the oil mist separator in the ninth embodiment.

For example, as shown in FIGS. 10A and 10B as a ninth preferred embodiment of the invention, the first baffle plate 5 may be fitted around the gas lead-through pipe 4 with several flanges 52. The flanges 52 protrude from the outer circumference in the radial direction of the first baffle plate 5, and are fixed to the inner wall surface 31 at front ends thereof. This constitution also can provide the same effects as described above. Further, the flanges 52 can have a twisted shape (blade shape) to facilitate swirl flow and to enhance the separation efficiency. Furthermore, the first baffle plate 5 may be integrated with either of the gas lead-through pipe 4 and the inner wall surface 31, or may be fixed thereto by assembling. The first baffle plate 5 may be composed of several plates.

In the respective embodiments described above, the gas-liquid separator of the present invention is applied to the positive crankcase ventilation system as the oil mist separator; however, it is not limited to that, but may be applied to similar systems for removing liquid component from gas to provide the same effects. For example, the gas-liquid separator of the invention can be applied to separation of drops of water from gas, separation of refrigerant from gas, separation of solid from gas, separation of fluids having different relative densities from each other, and the like.

In the present invention, the generally cylindrical vessel is not necessary to be completely cylindrical, but may have a polygon in cross-section so long as it can provide a centrifugal separation effect. However, the completely cylindrical shape is preferable to enhance the centrifugal separation effect. The annular baffle plate needs not be completely annular provided that the shape is approximated to that of the vessel. For example, the baffle plate may have a polygonal shape in cross-section.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A gas-liquid separator comprising:
a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;
a gas lead-through pipe having a gas outlet and communicating with the cyclone chamber through the gas outlet, the gas outlet being disposed separately from the gas inlet in an axial direction of the vessel; and
a single baffle plate disposed in the cyclone chamber and, said single baffle plate generally dividing a space between: the gas outlet and the gas inlet to form a gas flow flowing from the gas inlet toward the gas outlet along the inner circumferential wall, wherein:
said baffle plate is made of a rigid material that maintains its shape when the gas flow is applied to said baffle plate; and
the gas lead-through pipe protrudes from the baffle plate at a side of said baffle plate that is opposite to the gas inlet,
wherein the baffle plate and the cylindrical vessel define an unobstructed space around the gas lead-through pipe between the gas inlet and the baffle plate.

2. The gas liquid separator according to claim 1, wherein the baffle plate has an annular shape.

3. The gas liquid separator according to claim 1, wherein:
the baffle plate has a fixation end that is fixed to one of the inner circumferential wall of the cyclone chamber and the gas lead-through pipe, and a free end that forms a gap with another one of the inner circumferential wall of the cyclone chamber and the gas lead-through pipe; and
the baffle plate is inclined from the fixation end toward the free end so that the free end is positioned at a lower side of the fixation end in the axial direction.

4. A gas-liquid separator comprising:
a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;
a gas lead-through pipe having a gas outlet and communicating with the cyclone chamber through the gas outlet, the gas outlet being disposed separately from the gas inlet in an axial direction of the vessel and being provided at a position higher than the gas inlet in a vertical direction; and
a baffle plate disposed in the cyclone chamber and generally dividing a space between the gas outlet and the gas inlet to form a gas flow flowing from the gas inlet toward the gas outlet along the inner circumferential wall, wherein:
the gas lead-through pipe protrudes from the baffle plate at a side of the baffle plate that is opposite to the gas inlet.

5. A gas-liquids separator comprising:
a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;
a gas lead-through pipe having a gas outlet and communicating with the cyclone chamber through the gas outlet, the gas outlet being disposed separately from the gas inlet in an axial direction of the vessel; and
a baffle plate disposed in the cyclone chamber along the inner circumferential wall of the cyclone chamber at a position closer to the gas outlet than to the gas inlet and generally dividing a space between the gas outlet and the gas inlet to form a gas flow flowing from the gas inlet toward the gas outlet along the inner circumferential wall, wherein:
the gas lead-through pipe protrudes from the baffle plate at a side of the baffle plate that is opposite to the gas inlet.

6. A gas-liquid separator comprising:
a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;

a gas lead-through pipe penetrating a generally central portion of a lower end wall of the cyclone chamber, extending in the cyclone chamber, and having a gas outlet at an upper end thereof through which the gas is discharged from the cyclone chamber; and a baffle plate disposed in the cyclone chamber and generally dividing a space between the gas outlet and the gas inlet to form a gas flow flowing along the inner circumferential wall from the gas inlet toward the gas outlet, wherein:

the gas lead-through pipe protrudes from the baffle plate at a side of the baffle plate that is opposite to the gas inlet; and the gas inlet is provided at a position lower than the gas outlet in a vertical direction.

7. A gas-liquid separator comprising:

a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;

a gas lead-through pipe penetrating a generally central portion of an end wall of the cyclone chamber, extending in the cyclone chamber, and having a gas outlet at a front end thereof through which the gas is discharged from the cyclone chamber; and a baffle plate disposed in the cyclone chamber and generally dividing a space between the gas outlet and the gas inlet to form a gas flow flowing along the inner circumferential wall from the gas inlet toward the gas outlet, wherein:

the gas lead-through pipe protrudes from the baffle plate at a side of the baffle plate that is opposite to the gas inlet; and the gas outlet is provided at a position higher than the gas inlet in the axial direction of the cyclone chamber.

8. The gas liquid separator according to claim 7, wherein the baffle plate is disposed along the inner circumferential wall of the cyclone chamber at a position closer to the gas outlet than to the gas inlet.

9. A gas-liquid separator comprising:

a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;

a gas lead-through pipe penetrating a generally central portion of an upper end wall of the cyclone chamber, extending in the cyclone chamber, and having a lower opening at a lower end thereof, the gas lead-through pipe communicating with a spreader chamber, which is provided above the cyclone chamber, through an upper opening provided at an upper end of the gas lead-through pipe for introducing the gas from the cyclone chamber into the spreader chamber through the lower opening and the upper opening;

a first baffle plate disposed in the cyclone chamber and generally dividing a space between the lower opening of the gas lead-through pipe and the gas inlet to form a gas flow flowing along the inner circumferential wall from the gas inlet toward the lower opening of the gas lead-through pipe; and a second baffle plate disposed in the spreader chamber and facing the upper opening of the gas lead-through pipe so that the gas introduced from the upper opening hits the second baffle plate to be guided along the second baffle plate, wherein the baffle plate and the cylindrical vessel define an unobstructed space around the gas lead-through pipe between the gas inlet and the baffle plate.

10. The gas-liquid separator according to claim 9, wherein the spreader, chamber has a bottom face inclined downward toward a central portion thereof.

11. The gas-liquid separator according to claim 9, further comprising a filter member disposed in the spreader chamber at a downstream side of the second baffle plate.

12. The gas-liquid separator according to claim 11, wherein the second baffle plate and the filter member are integrated together.

13. A gas-liquid separator comprising:

a generally cylindrical vessel defining therein a cyclone chamber and having a gas inlet being open on an inner circumferential wall of the cyclone chamber for introducing a gas into the cyclone chamber in a circumferential direction of the cyclone chamber for separating a liquid component from the gas by a centrifugal separation effect;

a gas lead-through pipe having a gas outlet and communicating with the cyclone chamber through the gas outlet, the gas outlet being disposed separately from the gas inlet in an axial direction of the vessel; and a baffle plate disposed in the cyclone chamber and generally dividing a space between the gas outlet and the gas inlet to form a gas flow flowing from the gas inlet toward the gas outlet along the inner circumferential wall, wherein:

the baffle plate is disposed substantially parallel to an upper end wall surface of the cyclone chamber; and the gas lead-through pipe protrudes from the baffle plate at a side of the baffle plate that is opposite to the gas inlet.

14. The gas-liquid separator according to claim 13, wherein the baffle plate is a rigid flat plate that maintains its shape when the gas flow is applied to the baffle plate.

* * * * *